United States Patent
Hillebrand

(10) Patent No.: US 7,596,645 B1
(45) Date of Patent: Sep. 29, 2009

(54) METHOD FOR AUTOMATICALLY ADAPTING TO THE CAPABILITIES OF A DATA-TRANSMITTING TERMINAL AND A DEVICE SUPPLYING DATA TO SAID TERMINAL REQUESTING THE DATA

(75) Inventor: Rainer Hillebrand, Greven (DE)

(73) Assignee: T-Mobile Deutschland GmbH, Bonn (DE)

( * ) Notice: Subject to any disclaimer, the term of this patent is extended or adjusted under 35 U.S.C. 154(b) by 331 days.

(21) Appl. No.: 10/048,114

(22) PCT Filed: Jul. 26, 2000

(86) PCT No.: PCT/DE00/02454

§ 371 (c)(1),
(2), (4) Date: Mar. 5, 2002

(87) PCT Pub. No.: WO01/08097

PCT Pub. Date: Feb. 1, 2001

(30) Foreign Application Priority Data

Jul. 27, 1999 (DE) .............................. 199 34 787

(51) Int. Cl.
*G06F 13/12* (2006.01)
*H04N 7/16* (2006.01)
*G09G 5/00* (2006.01)

(52) U.S. Cl. ............... 710/62; 725/141; 725/153; 345/3.1; 345/3.4; 345/601; 345/533

(58) Field of Classification Search ............... 710/62, 710/65; 725/141, 153; 345/3.1, 3.4, 601, 345/533
See application file for complete search history.

(56) References Cited

U.S. PATENT DOCUMENTS

| | | | | | |
|---|---|---|---|---|---|
| 5,728,960 | A | * | 3/1998 | Sitrick | 84/477 R |
| 6,012,090 | A | * | 1/2000 | Chung et al. | 709/219 |
| 6,101,620 | A | * | 8/2000 | Ranganathan | 714/718 |
| 6,104,876 | A | * | 8/2000 | Daum et al. | 710/37 |
| 6,108,709 | A | * | 8/2000 | Shinomura et al. | 709/239 |
| 6,161,140 | A | * | 12/2000 | Moriya | 709/228 |
| 6,167,441 | A | * | 12/2000 | Himmel | 709/217 |
| 6,247,135 | B1 | * | 6/2001 | Feague | 713/400 |
| 6,289,396 | B1 | * | 9/2001 | Keller et al. | 719/323 |
| 6,311,215 | B1 | * | 10/2001 | Bakshi et al. | 709/221 |
| 6,618,026 | B1 | * | 9/2003 | Grigor et al. | 345/1.1 |
| 2005/0198063 | A1 | * | 9/2005 | Thomas et al. | 707/102 |

FOREIGN PATENT DOCUMENTS

| | | |
|---|---|---|
| DE | 198 31 169 A1 | 1/2000 |
| WO | WO 98/37698 | 8/1998 |
| WO | WO 98/43177 | 10/1998 |

OTHER PUBLICATIONS

International Search Report mailed Oct. 24, 2000.
Literature: Chung-Sheng Li et al: "Multimedia Content Description in the Infopyramid", pp. 3789-3792, XP-002141758.

* cited by examiner

*Primary Examiner*—Niketa I Patel
(74) *Attorney, Agent, or Firm*—Baker & Daniels LLP

(57) ABSTRACT

A method for automatically adapting to the capabilities of a data transmitting terminal a device supplying data to said terminal requesting the data. The method is characterized in that the data supplying device receives information concerning the capabilities of the device requesting data to send to the latter the data to be transmitted in accordance with the specified capabilities.

3 Claims, 2 Drawing Sheets

METHOD FOR AUTOMATICALLY ADAPTING TO THE CAPABILITIES OF A DATA-TRANSMITTING TERMINAL AND A DEVICE SUPPLYING DATA TO SAID TERMINAL REQUESTING THE DATA

BACKGROUND OF THE INVENTION

The invention relates to a process for the automatic adaptation of the data to be transferred to a data-requesting device, to the capabilities of this terminal.

In today's data communication networks there exist terminals with different displays, input apparatuses and computer performances. Displays differ above all in the color depth, resolution, and size. Input apparatuses can be, for example, keyboards or contact-sensitive surfaces. When data are transferred from a data-preparing device to a terminal, it is important, for as short as possible a transfer time of the data, that the data volume to be transferred at a given band width be as small as possible. Since, however, it is not known to the sending device what properties the end terminal possesses, the data and therewith the data volume are not adapted to the properties of the end terminal. To an end terminal with a display with a low resolution and black-and-white representation there are sent, for example, the same data as to an end terminal with a high resolution and a plurality of representable colors.

This leads to the result that data are transferred which cannot be processed in the end terminal by reason of the latter's capabilities. Resources of the transfer media, of the sending devices, and of the receiving end terminal are wasted.

In WO-A-98 37698 an adaptable data transfer system is disclosed, in which a data-preparing server is provided which, either by software or suitable hardware, executes an algorithm for the generation and storage of a plurality of hierarchically ranked video data streams, in which it is covered, which multimedia characteristics a data-requesting device has, and on the basis of this information there is transmitted a special selection of the available video-data stream to the data-requesting device.

WO-A-98 43177 teaches a system for the dynamic recording of data transmitting between computers. A so-called proxy-server is provided, which comprises devices for the dynamic adaptation of data transmitted from a network server to a network client, in which system the adaptation occurs in dependence on a selection criterion delivered from the network client. The selection criterion can be, for example, the hardware configuration of the network client.

The problem of the present invention lies, therefore, in giving a process for the automatic adaptation of the data to be transferred from a data-preparing device to a data-requesting device, to the capabilities of the data-requesting device, which process can react very flexibly to the capabilities of the data-requesting device.

SUMMARY OF THE INVENTION

The solution of the problem is achieved by transmitting a list of usable display formats to the data-preparing device which then selects the best suited display format.

According to the invention, in the data transmission a reduction of the resource expenditure becomes possible by the means that the data-preparing device receives information data about the capabilities of the receiving terminal, in order to transmit the data to be transferred in correspondence to the pre-determined capabilities.

The advantage of this process for the operator of the data preparing device lies, inter alia, in lower needed computing performance of the sending device and therefore in lower acquisition and maintenance costs. According to the transmission technique, the operator's transmission costs are reduced.

The advantages of this process for the user of the data-requesting device lie, inter alia, in shorter data transmission time and in lower transmission costs. Since according to this process the sending device can also adapt the data to the display of the receiving device, the user can also receive a representation of the data adapted to the display. For example, textual information data which otherwise are contained in graphics can, with end terminals with pure text representation, be sent as text to the end terminal and there brought into display.

BRIEF DESCRIPTION OF THE DRAWING

In the following the invention is described in detail with the aid of an example of execution with reference to a drawing FIGURE. From the drawing and its description, there are yielded further features and advantages of the invention.

DETAILED DESCRIPTION

Figure 1:
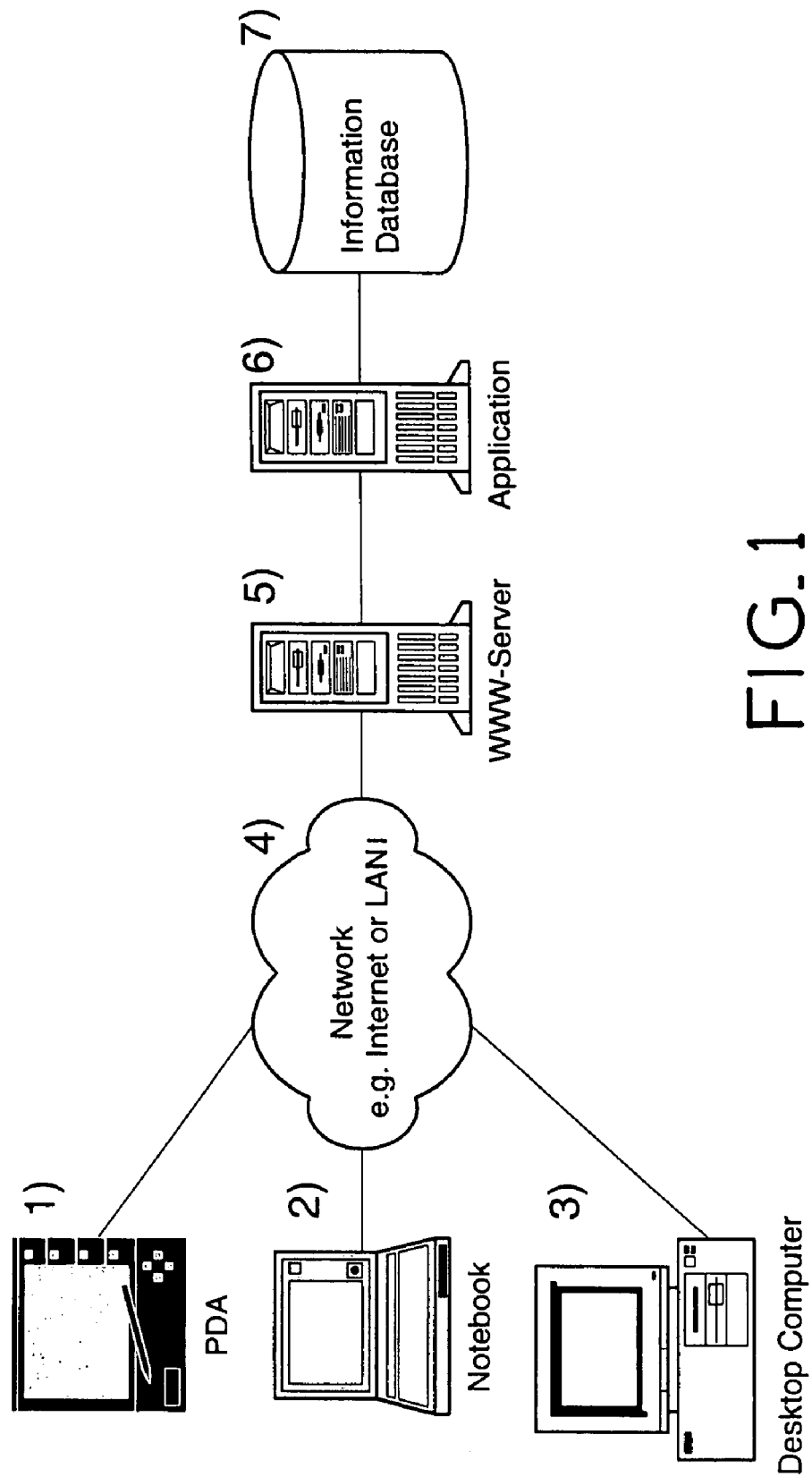
In FIG. 1 a scenario is described in which this process is used for the automatic adaptation of the data to be transferred from a data-preparing device to a data-requesting device, to the capabilities of this end terminal.
Figure 2:
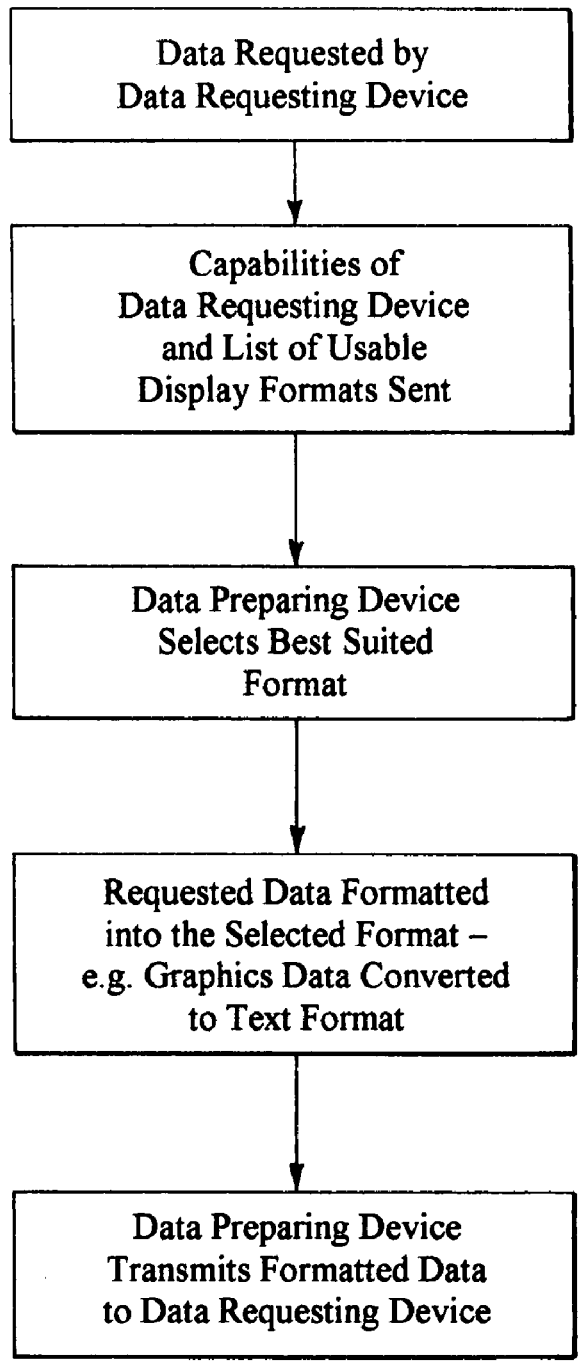
FIG. 2 is a flow chart illustrating the method steps.

By means of three different apparatuses 1, 2 and 3, a user requests information from a WWW-server 5. In each end terminal there is installed a WWW-browser for this.

In the end terminal 1, in this case the data-receiving device, there is a Personal Digital Assistant (PDA). The display of the PDA has a resolution of 160×160 pixels, in a black-and-white representation with pure text representation possibility. The end terminal 2 is a Notebook with a display with the resolution of 640×480 pixels, which can represent 256 colors and graphics.

The display of the desktop computer 3 has a resolution of 1600×1200 pixels, which can represent about 16 million colors and graphics.

EXAMPLE 1

The user, over a user interface such as, for example, a keyboard, enters the address www.info.com of the WWW-server 5 (data-preparing device) into the WWW-browser, to request the information data belonging to this address from the server 5. The WWW-browser establishes a connection to the WWW-server 5, and communicates to the WWW-server by which address information data are requested.

According to the invention there are further conveyed to the WWW-server 5 information data as to which capabilities the end terminal 1 possesses. To these capabilities there belong, inter alia, the resolution of the display and the number of representable colors. In the present case the end terminal 1 will instruct the WWW-server 5 that it should communicate the information data with a resolution of 160×160 pixels in black-and-white and in pure text representation. The standard resolutions and color depths can be correspondingly coded for this, for example with 2-place numbers so that, for example, only one byte suffices for the transmission of the information.

The WWW-server 5 reports/communicates the address and capabilities of the utilization device 6. The utilization device 6 requests from the information data bank 7 the information data belonging to the address www.info.com and formats these in correspondence to the capabilities of the end terminal 1. Since the end terminal 1 can represent only text, the application device generates only textual information in black-and-white representation. Graphics are not generated or cannot be read from the information data bank. The application device 6 delivers the data to the server 5 which sends these to the WWW-browser in 1. The WWW-browser interprets the formatting and makes the information data available in the display of the end terminal 1.

EXAMPLE 2

The user uses, in contrast to example 1, a notebook 2. As described in example 1, the WWW-server 5 obtains the information data about the capabilities of the end terminal 2 and forwards these data to the utilization device 6. Since the end terminal can represent graphics with a maximum of 256 colors, the utilization device 6 generates or conveys from the information data bank 7, graphics with a maximal color depth of 256 colors, which insofar as possible do not exceed 640× 480 pixels. For the coloration of text information data, there are chosen only colors from a given color pallet with 256 colors standing for selection. The utilization device 6 delivers the data to the server 5, which sends these to the WW-browser in the end terminal 2. The WWW-browser interprets the formatting and represents the information data in the display of the notebook 2. In comparison to example 1, because of the color information data and of the graphics, a larger data volume must be transmitted between the WWW-server and the end terminal. However, the size and color depth (256 colors) are utilized.

EXAMPLE 3

In contrast to examples 1 and 2, the user uses a desktop computer 3. Since, as in examples 1 and 2, the capabilities of the end terminal 3 are known by the utilization device 6, the utilization device 6 generates or conveys from the information data bank 7 graphics with a maximal color depth of 16 million colors, which insofar as possible do not exceed 1600× 1200 pixels. For the coloration of text information data, there are chosen colors from a color pallet with 16 million colors standing for selection. The utilization device 6 delivers the data to the server 5, which sends these to the WWW-browser in the end terminal 3. The WWW-browser interprets the formatting and represents the information data in the display of the desktop computer 3. In comparison to examples 1 and 2, because of the color and graphics information data, a greater data volume must be transmitted between the WWW-server and the end terminal. The size and color depth (16 million colors) of the display, however, are utilized.

Obviously the invention also comprises end terminals that can process several different display formats. In this case, for example, a list of usable display formats can be communicated to the data-preparing device. The latter then, and according to availability, selects the best-suited display format.

Further, the invention is not restricted to a utilization in the internet, but is usable for every type of data transfer in arbitrary data networks, thus, for example, also in the data transfer between subscribers of the digital mobile radio network.

The invention claimed is:

1. A process for transferring data from a data-preparing device to a data-requesting device, comprising:

the data-requesting device requests, over a network, requested data to be transmitted to it by the data-preparing device;

the data-requesting device transmits to the data-preparing device over the network information data about the capabilities of the data-requesting device, said information data transmitted by the data-requesting device including a list of usable display formats for the data-requesting device, said list comprising a plurality of display formats;

the data-preparing device then, according to availability at the data-preparing device, automatically selects the best-suited a single display format from the list of usable display formats transmitted by the data-requesting device;

the requested data being stored in a central data bank of the data-preparing device;

a formatting device formats, on call, the requested data into the selected display format; and the data-preparing device then transmits the requested data over the network to the data-requesting device in the selected display format.

2. The process according to claim 1, wherein the information data are transmitted to the data-preparing device over a device engaged between the data-requesting device and the data-preparing device.

3. A process for transferring data from a data-preparing device to a data-requesting device, comprising:

the data-requesting device requests, over a network, requested data to be transmitted to it by the data-preparing device wherein the requested data includes textual data contained in graphics data;

the data-requesting device transmits to the data-preparing device over the network information data about the capabilities of the data-requesting device, said information data transmitted by the data-requesting device including a list of usable display formats for the data-requesting device, said list comprising a plurality of display formats;

the data-preparing device then, according to availability at the data-preparing device, automatically selects a single display format from the list of usable display formats transmitted by the data-requesting device;

the requested data being stored in a central data bank of the data-preparing device;

a formatting device formats, on call, the requested data into the selected display format the selected display format being mere textual format; and the data-preparing device then transmits the requested data over the network to the data-requesting device in the selected display textual format.

* * * * *

UNITED STATES PATENT AND TRADEMARK OFFICE
CERTIFICATE OF CORRECTION

PATENT NO. : 7,596,645 B1  Page 1 of 1
APPLICATION NO. : 10/048114
DATED : September 29, 2009
INVENTOR(S) : Rainer Hillebrand It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 508 days.

Signed and Sealed this

Fourteenth Day of December, 2010

David J. Kappos
*Director of the United States Patent and Trademark Office*